W. R. MOTT.
ELECTRODE COATING.
APPLICATION FILED JAN. 14, 1919.

1,314,603.

Patented Sept. 2, 1919.

INVENTOR
W. R. MOTT
BY
ATTORNEY

UNITED STATES PATENT OFFICE.

WILLIAM ROY MOTT, OF LAKEWOOD, OHIO, ASSIGNOR TO NATIONAL CARBON COMPANY, INC., A CORPORATION OF NEW YORK.

ELECTRODE-COATING.

1,314,603.　　　　　Specification of Letters Patent.　　Patented Sept. 2, 1919.

Application filed January 14, 1919. Serial No. 271,124.

*To all whom it may concern:*

Be it known that I, WILLIAM R. MOTT, a citizen of the United States, residing at Lakewood, in the county of Cuyahoga and State of Ohio, have invented a certain new and useful Improvement in Electrode-Coatings, of which the following is a full, clear, and exact description.

This invention relates to an improvement in carbon or graphite electrodes for electric furnaces, and more particularly to an improved coating material for such articles, as well as other carbon or graphite articles which are to be subjected to high temperatures in oxidizing atmospheres.

A large number of materials have been suggested for this purpose, but I am not aware of any coatings which are at present in commercial use on carbon electrodes for electric furnaces. There are a number of disadvantages which generally make the use of coatings impractical. The materials of the coatings as a rule, although not combustible in the same manner as the carbon of the electrode, oxidize too readily or fuse and melt off for a considerable distance and thus do not protect the electrode. Many of the more infusible materials peel off or crack under the heat in the furnace, and expose the electrode so that it is attacked at these places. The character of the coating material is often objectionable on account of contaminating the charge and the product to be manufactured. Expense is another important disadvantage of most materials which have been suggested. The method of applying the coatings as a rule requires a change in the methods of baking the electrodes in cases where the coated article must be baked to fuse the coating. In the baking process as well as during use, pinholes are often formed in the coatings, which permit the gases to attack the carbon therethrough and burn the electrode under the coating. When this occurs, large amounts of coating, thus loosened from time to time, fall into the charge and often disturb the operation proceeding in the furnace.

The object of the present invention is to eliminate the disadvantages set forth by the use of metal coatings applied to the finished electrode.

Figure 1:
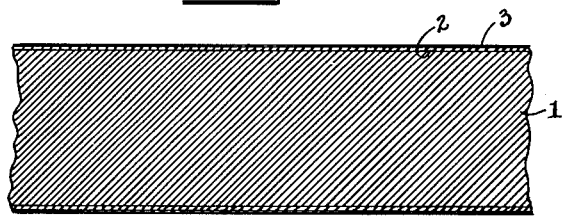
Figure 2:
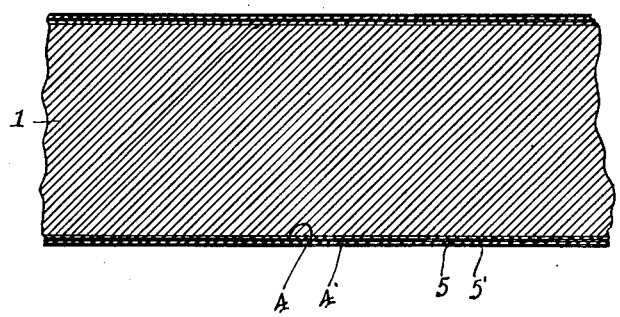

In the drawing, Figures 1 and 2 show an electric furnace electrode coated in accordance with the present invention.

A number of different metals of good refractory properties have been suggested as coating materials for electrodes. None of these, however, have proved satisfactory for various reasons. I have discovered that the reason practically all of the more refractory metals are unsatisfactory for protective coatings for carbon or graphite articles, is because they dissolve carbon, and am therefore able to devise metallic coatings which will protect carbon articles, particularly furnace electrodes. I have further discovered that combinations of certain metals are especially good in filling the requirements.

According to the invention the furnace electrodes or other carbon articles may be finished in the usual manner and coatings of two metals are then applied thereto. The metals which have been found to be suitable for the first coating which is placed adjacent the carbon, are metals of relatively high boiling point which do not dissolve carbon to an appreciable extent at high temperatures. This class of metals includes lead, bismuth, antimony, tin and copper, which volatilize at temperatures between 400° and 2300° C., although these metals form oxids at relatively low temperatures corresponding to red heat or about 500° C., and for this reason do not provide protection for the electrodes above that temperature. Most of the desirable metals melting or boiling at higher temperatures than those mentioned, unfortunately dissolve carbon if applied adjacent thereto, to such an extent at high temperatures that they do not provide the requisite protective action in spite of their refractory properties, as I have discovered that the coating is rendered ineffective if it absorbs carbon.

However, many of these refractory metals which dissolve carbon become suitable for coatings for carbon articles if they are applied in the form of a second coating over coatings of the first metals set forth. To satisfy the requirements of the second coating I have found that it is necessary to use metals which are more refractory than the metals of the first coating, and which also form a thin film of protective oxids having high melting and high boiling points. The second coating protects the first coating from oxidation. The metals which have been found to fulfil this requirement are nickel, chromium, aluminum, silicon, zirconium and tantalum. All of these metals which are desirable on account of their property of forming a film of protective oxids, also happen to be undesirable when used in the form of a single coating adjacent the carbon, on account of having the property of dissolving carbon at high temperatures, and therefore are not suitable if used alone, or next to the carbon.

In some instances the two metals may be applied simultaneously, as only a small amount of the metal dissolving carbon will be affected before a protective, non-carbon-absorbing metal film will be formed. In a similar manner upon volatilization or oxidation of the metal of lower melting point, a film of the metal or oxid of the metal of higher melting point is formed to protect the metal underneath.

Although a large number of metals are set forth, copper and nickel are preferred at present, from a standpoint of cheapness and because they may be readily plated on the carbon in thin, uniform layers by electrolysis. The preferable method is to first clean the electrodes, for example by dipping in gasolene, and then to copper plate the electrode and afterward to electro-plate the nickel over the copper. The thickness of the copper coating is preferably only about one thousandth of an inch and the nickel only .3 thousandths of an inch. In Fig. 1 the electrode is designated by 1, the copper coating by 2 and the nickel coating by 3, the thickness of the coatings being greatly exaggerated for purposes of illustration.

Instead of using a single coating of copper and nickel, several of these coatings may be alternately applied as shown in Fig. 2. The thickness of the copper coatings 4, 4', and nickel coatings 5, 5', are preferably decreased when several alternate coatings are used.

The coatings have been found to cover the entire external surface of the electrodes and no pin-holes are evident. Furnace electrodes, especially the larger sizes from 10 to 24 inches in diameter, have very rough surfaces, but this does not seem to prevent the outer surface of the carbon from being entirely covered so that the article is thoroughly protected.

The application of a thin coating of copper alone would only protect the electrode at temperatures up to about 500° C., at which temperature it oxidizes and becomes a relatively poor conductor, and carbon also burns; but when nickel is coated over the copper the carbon electrode is protected up to temperatures of about 2500° C., even in the presence of gases containing almost as much oxygen as is present in air. This action of the extremely thin film of nickel is quite remarkable in view of the relatively low temperatures at which copper serves as a protective agent. The copper adheres to the carbon very well and a plating of nickel may be easily applied to an electrode having a copper coating.

In use the coating adheres to the electrode until the actual heating region is reached and prevents the end of the electrode from spindling down to smaller diameters. Useless combustion of the electrode is almost entirely eliminated in this manner. The coating of copper and nickel also increases the conductivity far in excess of the amount which could ordinarily be accounted for by the addition of such a small amount of metal. The contact resistance at the holder is also decreased so that burning of the electrode at this point is eliminated. In proportion to the cost of the electrode the additional cost of the coating is low and the extra service compensates for this many times over. On account of the extremely small amount of metal used the charge is not appreciably contaminated, and in many cases the metals used are desirable in the finished product.

Having described my invention, what I claim is:—

1. In electrodes for electric furnaces, a carbon body having a coating adjacent thereto, consisting of a metal which is substantially a non-solvent for carbon at high temperatures, and a second coating over the first coating consisting of metal of high melting point adapted to form a protective oxid film of high melting and high boiling point.

2. In electrodes for electric furnaces, a carbon body having a coating of nickel and a coating between said nickel and carbon consisting of a metal which is a non-solvent for carbon at high temperatures.

3. In electrodes for electric furnaces, a carbon body having a coating of copper adjacent thereto, and a coating of nickel on said copper.

4. In electrodes for electric furnaces, a carbon body having a coating of copper adjacent thereto and a second coating over said first coating consisting of a metal of high melting point adapted to form a protective oxid film of high melting and high boiling point.

5. In electrodes for electric furnaces, a carbon body having a coating of copper adjacent thereto and a second coating over said first coating consisting of a metal which is a solvent for carbon at high temperatures and adapted to form a protective oxid film of high melting and high boiling point.

In testimony whereof, I hereunto affix my signature.

WILLIAM ROY MOTT.